United States Patent [19]

Breysse et al.

[11] Patent Number: 5,157,009

[45] Date of Patent: Oct. 20, 1992

[54] CATALYST FOR HYDROREFINING HYDROCARBON FEEDSTOCKS CONTAINING NIOBIUM TRISULPHIDE

[75] Inventors: Michéle Breysse, Caluire; Thierry Des Courieres, Lyons; Michél Danot, Nantes; Christophe Geantet, Villeurbanne; Jean-Louis Portefaix, Caluire, all of France

[73] Assignee: Elf France, Courbevoie, France

[21] Appl. No.: 687,124

[22] Filed: Apr. 18, 1991

[30] Foreign Application Priority Data

Apr. 20, 1990 [FR] France .................. 90 05048

[51] Int. Cl.$^5$ .................. B01J 21/04; B01J 27/043; B01J 27/0I51; C10G 45/04
[52] U.S. Cl. .................. 502/216; 208/215; 208/216 R; 208/254 H; 423/562; 502/220; 502/221; 502/222
[58] Field of Search ............. 502/216, 220, 221, 219; 423/562

[56] References Cited

U.S. PATENT DOCUMENTS

| | | | |
|---|---|---|---|
| 3,864,167 | 2/1975 | Broadhead et al. | 429/194 |
| 4,323,480 | 4/1982 | Dines et al. | 423/562 |
| 4,386,115 | 1/1983 | Chianelli et al. | 502/216 |
| 4,892,795 | 1/1990 | Fuhg et al. | 429/194 |

*Primary Examiner*—Paul E. Konopka
*Attorney, Agent, or Firm*—Burgess, Ryan & Wayne

[57] ABSTRACT

Catalyst for hydrorefining hydrocarbon feedstocks consisting of niobium trisulphide, bulk or deposited on an inert support.

This catalyst is particularly efficient for the reactions of scission of carbon-nitrogen and carbon-sulphur bonds.

5 Claims, No Drawings

CATALYST FOR HYDROREFINING HYDROCARBON FEEDSTOCKS CONTAINING NIOBIUM TRISULPHIDE

BACKGROUND OF THE INVENTION

1. Field of the Invention

This invention relates to a catalyst for hydrorefining hydrocarbon feedstocks and to a hydrorefining process which makes use of the said catalyst.

2. Description of the Related Art

Petroleum and petroleum fractions are highly complex mixtures in which, besides the hydrocarbons, there are present compounds containing heteroatoms such as sulphur, nitrogen and oxygen. These are generally impurities which are detrimental to the good quality of the petroleum products. In particular, they are responsible for problems related to pollution, corrosion, smell and stability. It is therefore important to remove them during the refining. This generally involves a treatment with hydrogen in the presence of a catalyst which promotes the rupture of the carbon-heteroatom bonds. This treatment is called hydrorefining.

Considerable research effort has been deployed to find efficient hydrorefining catalysts. The catalysts which are most commonly employed are based on nickel, molybdenum, tungsten or cobalt.

The remainder is prepared by impregnating alumina, generally gamma alumina, with an aqueous solution of metal salts. After impregnation the support is dried and then calcined.

The conversion of the metal oxides formed, into sulphides, takes place in the presence of sulphur compounds such as hydrogen sulphide, carbon disulphide, elemental sulphur, mercaptans or thioethers. This sulphurisation generally takes place in the presence of hydrogen.

Until now, niobium sulphide has stimulated little interest as a hydrorefining catalyst. Pecorado and Chianelli (J. Catal. 67 430 (1981)) have shown that bulk niobium sulphide has a weak activity for the hydrodesulphurisation of dibenzothiophene. Similarly, carbon-supported niobium sulphide is very weakly active in hydrodesulphurisation (Vissers, Bull. Soc. Chim. Belg. 93 813 (1984)) and in hydrodenitrogenation.

In all the studies the material involved is niobium disulphide, which is the most stable sulphur derivative of niobium and the one easiest to synthesize.

We have now found that another niobium sulphide, the trisulphide, which is difficult to synthesize and unstable in an atmosphere which is not rich in sulphur, exhibits remarkable catalytic properties.

SUMMARY OF THE INVENTION

This invention relates, therefore, to a catalyst for hydrorefining hydrocarbon feedstocks, characterised in that it contains niobium trisulphide.

This catalyst may consist of bulk niobium sulphide or else of supported niobium sulphide.

Bulk niobium trisulphide is prepared by heating niobium and sulphur in stoichiometric ratio under autogenous pressure and in the absence of air. This reaction is normally carried out at a temperature of 650° to 750° C.

PREFERRED EMBODIMENTS

We have found that on lowering the reaction temperature not only are the losses in sulphur avoided but there is also an increase in the specific surface area of the niobium trisulphide formed. The trisulphide is therefore prepared at a temperature of between 450° and 750° C., but preferably between 450° and 550° C. In fact, when working at a temperature close to 500° C., the specific surface area of the niobium trisulphide obtained is approximately 2.5 m$^2$/g. Even at this temperature the reaction is complete, provided that the treatment is sufficiently long, of the order of a fortnight. On the other hand, the specific surface area of 2.5 m$^2$/g cannot be exceeded using this direct method.

We have found a treatment which makes it possible to increase the specific surface area of niobium trisulphide. This treatment consists in inserting lithium into the crystalline lattice of niobium trisulphide and then in deinserting this lithium. The niobium trisulphide obtained has a specific surface which is much higher than that of the starting product. Thus, by starting with a niobium trisulphide whose specific surface is 2.5 m$^2$/g, we have obtained a trisulphide of 11.5 m$^2$/g and another of 18 m$^2$/g, depending on the quantity of lithium inserted.

The lithium insertion is carried out by reacting the trisulphide with an alkyllithium, in general butyllithium, in an inert solvent such as hexane. (Mishchenko, Zh. Neorg. Khim. 1987, 32 (7) 1591-5). A number of lithium atoms can be inserted per sulphide unit. The specific surface varies as a function of the quantity of lithium which is inserted. This quantity cannot exceed three lithium atoms per trisulphide unit.

The lithium is deinserted, for example, with a solution of iodine in a solvent such as acetonitrile.

Supported niobium trisulphide is obtained by impregnating an inert support with an aqueous solution of niobium salt. We have found unexpectedly that the catalytic activity of niobium trisulphide is much higher if niobium oxalate is chosen for the impregnation rather than other soluble salts such as, for example, ammonium niobate.

It is advantageous to carry out this impregnation "dry", that is to say so that there is no supernatant liquid above the solid. After drying, this impregnated solid is sulphurised with a mixture of $N_2$—$H_2S$.

The sulphurisation temperature is between 300° and 600° C. and preferably between 350° and 450° C. The sulphurisation period is approximately 4 hours.

It is important to employ an inert support which does not exhibit any strong interaction with niobium, because the Nb-O bond is very strong and therefore difficult to break. A strong interaction with the support prevents the sulphurisation of the niobium. Among the inert supports we can mention carbon and silica.

Other metals can be deposited on the support. Thus, the niobium can be accompanied in the finished catalyst by other metal sulphides employed as hydrorefining catalysts, such as nickel, molybdenum, cobalt or tungsten sulphides.

The catalyst properties of bulk or supported niobium trisulphide have been measured in reactions which are characteristic of the hydrorefining, hydrodesulphurisation and hydrodenitrogenation processes, that is to say reactions leading to the rupture of carbon-sulphur and carbon-nitrogen bonds.

The catalytic activity of supported niobium trisulphide in the hydrodesulphurisation of thiophene is greatly superior to that of molybdenum sulphide which has the same metal content. Furthermore, the catalytic activity of niobium trisulphide in this reaction is approximately five times higher than that of niobium disulphide.

A number of hydrodenitrogenation reactions have been studied, such as the rupture of the carbon-nitrogen bond in an aliphatic amine such as n-pentylamine or in a heterocyclic compound such as piperidine.

The catalytic activity of niobium trisulphide is particularly remarkable in the case of the scission reactions of the carbon-nitrogen bonds.

In the conversion of n-pentylamine, niobium trisulphide exhibits an activity which is two times higher than that of rhodium sulphide and approximately seven times higher than that of molybdenum sulphide, which are the most highly active sulphides among those studied. The reason for this high activity has not yet been made completely clear. Nevertheless, studies of the mechanism of the conversion reactions of n-pentylamine and of piperidine show that coordination of the amine onto the transition metal via the nitrogen pair takes place first of all, followed by an abstraction of hydrogen in the beta position of the nitrogen. Niobium trisulphide containing $(S_2)^{2-}$ and $S^{2-}$ groups would appear to be more active than the sulphides containing solely $S^{2-}$ groups, in this stage.

Niobium trisulphide is also highly active as a catalyst for the hydrogenation and cracking of biphenyl. The trisulphide exhibits a catalytic activity which is approximately five times greater than that of the disulphide.

The selectivity of the cracking of biphenyl for cyclohexane and benzene is remarkable. It is 90%, compared with 20% in the case of the usual catalysts such as molybdenum or tungsten sulphides.

The following examples illustrate the invention without, however, limiting it.

EXAMPLE 1

Niobium oxalate $Nb(Nb(HC_2O_4)_5)$ from Niobium Products Co. Inc. is dissolved in a buffer solution, an aqueous solution containing 0.01M oxalic acid and ammonium oxalate. A high-surface inert support, the carbon C-Norit R×3, of 1200 m2/g, is introduced into this solution so that there is no supernatant liquid above the solid (so-called dry impregnation). After drying, the solid is then sulphurised with a $N_2$—$H_2S$ mixture for four hours at 400° C. The catalyst obtained contains 9% by weight of niobium.

EXAMPLE 2 (Comparative)

A similar catalyst, containing 9% by weight of niobium was prepared by impregnation with a solution of ammonium niobate ($NH_4NbO_3.H_2O$).

EXAMPLE 3

92.91 g of niobium and 96 g of sulphur are introduced into a reactor. The mixture is heated to 500° C. under autogenous pressure. This temperature is obtained in three days and is maintained for three weeks. The mixture is cooled slowly to room temperature. The reaction is complete, the product obtained is homogeneous.

X-ray diffraction measurement with a Siemens D 500 diffractometer is in agreement with the structure $NbS_3$.

The specific surface determined by BET is 2.5 m2/g.

EXAMPLE 4

0.75 g of $NbS_3$ whose specific surface is 2.5 m2/g, 25 ml of hexane and 8 ml of butyllithium are introduced into a phial. The reaction takes place with stirring for 5 days. The product is then filtered off, rinsed with hexane and dried. The structure of the product obtained corresponds to $Li_3NbS_3$. It is deinserted with a solution of iodine in acetonitrile, according to the equation:

$$Li_3NbS_3 + 3/2\ I_2 \rightarrow NbS_3 + 3Li\text{-}I$$

The specific surface measured by BET after deinsertion is 18 m2/g.

A product whose specific surface is 11.5 m2/g is obtained by employing 1.5 mols of iodine per mole of $NbS_3$.

EXAMPLE 5

We have compared the catalytic activities of supported $NbS_3$ prepared according to Example 1 and Comparative Example 2 in hydrodesulphurisation of thiophene at 573K at a total pressure of 1 atmosphere and a reactant pressure of 24 10² Pa. All the catalysts contain 9% by weight of niobium.

TABLE I

| Catalyst | Activity $10^{-8}$ mol s$^{-1}$ g$^{-1}$ |
|---|---|
| EXAMPLE 1 | 105 |
| EXAMPLE 2 (Comparative) | 18 |
| Molybdenum sulphide on commercial alumina (9% Mo) | 32 |

EXAMPLE 6

We have compared the intrinsic rate of the conversion of piperidine, measured as the rate of disappearance of the reactant. We have operated at 300° C. at a partial hydrogen pressure of 3 MPa, a partial piperidine pressure of 0.026 MPa and an $H_2S$ partial pressure of 0.006 MPa. The catalysts tested were $NbS_3$ according to Example 4, $NbS_2$ and other metal sulphides.

TABLE 2

| Catalyst | Surface* (m2/g) | Specific rate $10^{-9}$ mol s$^{-1}$ g$^{-1}$ | Intrinsic rate $10^{-9}$ mol s$^{-1}$ m$^{-2}$ |
|---|---|---|---|
| $NbS_3$(Ex.4) | 11.5 | 1070 | 93.0 |
| $NbS_2$ | 9 | 520 | 57.8 |
| $MoS_2$ | 29 | 1150 | 39.6 |
| $WS_2$ | 58 | 820 | 14.1 |
| $Co_9S_8$ | 12 | 110 | 9.2 |
| $Ni_3S_2$ | 12 | 28 | 2.3 |

*measured by the BET method on the sulphurised catalyst and before catalyst test.

EXAMPLE 7

We have compared the intrinsic rate of the conversion of n-pentylamine, measured as the rate of appearance of $C_5$ hydrocarbons. We have operated at 275° C. at a hydrogen partial pressure of 0.1 MPa, an n-pentylamine partial pressure of 0.133 kPa and an $H_2S$ partial pressure of 4 kPa. The catalysts tested were $NbS_3$ according to Example 4, $NbS_2$ and other metal sulphides.

TABLE 3

| Catalyst | Surface* (m2/g) | Specific rate $10^{-9}$ mol s$^{-1}$ g$^{-1}$ | Intrinsic rate $10^{-9}$ mol s$^{-1}$ m$^{-2}$ |
|---|---|---|---|
| $NbS_3$(Ex.4) | 11.5 | 880 | 76.5 |
| $NbS_2$ | 9 | 92 | 10.2 |
| $MoS_2$ | 64 | 61 | 9.6 |
| $WS_2$ | 58 | 331 | 5.7 |
| $Co_9S_8$ | 40 | 93 | 2.3 |
| $Ni_3S_2$ | 6 | 22 | 3.7 |
| $Rh_2S_3$ | 89 | 960 | 10.8 |

In the case of the same reaction we have compared a catalyst containing 9% of niobium according to Example 1, a catalyst containing 9% of molybdenum on alumina and a commercial nickel-molybdenum catalyst on alumina (HR 346 from Procatalyse). We have determined the specific rate and the selectivity for the appearance of $C_5$ at 20% conversion.

TABLE 4

| Catalyst | Specific rate $10^{-7}$ mol s$^{-1}$ g$^{-1}$ | Selectivity for $C_5$ at 20% conversion |
|---|---|---|
| Nb/c(Ex.1) | 8 | 60 |
| Mo/Al | 8 | 36 |
| HR 346 | 10 | 46 |

The superior selectivity of niobium trisulphide is clearly seen.

EXAMPLE 8

We have compared the intrinsic rate of the conversion of biphenyl at 530K, a total pressure of 23 $10^5$ Pa, a reactant pressure of 8 $10^2$ Pa and an added $H_2S$ partial pressure of 4.3 $10^2$ Pa. The catalysts tested are $NbS_3$ according to Example 4, $NbS_2$ and other metal sulphides.

TABLE 5

| Catalyst | Surface ($m^2$/g) | Specific rate $10^{-10}$ mol s$^{-1}$ g$^{-1}$ | Intrinsic rate $10^{-10}$ mol s$^{-1}$ m$^{-2}$ |
|---|---|---|---|
| $NbS_3$ (Ex.4) | 11.5 | 480 | 41.8 |
| $NbS_2$ | 9 | 250 | 27.8 |
| $MoS_2$ | 51 | 510 | 11.2 |
| $WS_2$ | 63 | 760 | 12.1 |
| $Co_9S_8$ | 26 | 120 | 4.6 |
| $Ni_3S_2$ | 20 | 76 | 3.8 |

We claim:

1. Catalyst for hydrorefining hydrocarbon feedstocks, comprised of niobium trisulphide as at least one of the catalytically active components and an inert carbon support.

2. Catalyst according to claim 1 wherein the specific surface area of the niobium trisulphide is increased by insertion of lithium followed by a deinsertion.

3. Catalyst according to claim 2, wherein the lithium is inserted with the aid of an alkyllithium, such as butyllithium, and the deinsertion is carried out by treatment with iodine in a solvent.

4. Catalyst according to claim 1 which is prepared by impregnating said inert carbon support with a solution of niobium oxalate, drying and subjecting said support to sulfurization with a mixture of $N_2$-$H_2S$.

5. Catalyst according to claim 4, which additionally includes at least one metal sulphide from the group consisting of nickel sulphide, molybdenum sulphide, cobalt sulphide and tungsten sulphide.

* * * * *

UNITED STATES PATENT AND TRADEMARK OFFICE
CERTIFICATE OF CORRECTION

PATENT NO. : 5,157,009

DATED : October 20, 1992

INVENTOR(S) : Michele Breysse et al.

It is certified that error appears in the above-identified patent and that said Letters Patent is hereby corrected as shown below:

Column 6, line 27; change "$N_2-H_{25}$" to --$N_2-H_2S$--

Signed and Sealed this

Twenty-third Day of November, 1993

*Attest:*

BRUCE LEHMAN

*Attesting Officer*     *Commissioner of Patents and Trademarks*